(12) United States Patent
Dice

(10) Patent No.: US 6,289,451 B1
(45) Date of Patent: Sep. 11, 2001

(54) SYSTEM AND METHOD FOR EFFICIENTLY IMPLEMENTING AN AUTHENTICATED COMMUNICATIONS CHANNEL THAT FACILITATES TAMPER DETECTION

(75) Inventor: David Dice, Foxboro, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/844,211

(22) Filed: Apr. 18, 1997

(51) Int. Cl.[7] ....................................................... H04L 9/00
(52) U.S. Cl. ......................................... 713/168; 713/170
(58) Field of Search ..................... 380/25, 30; 713/168, 713/170

(56) References Cited

U.S. PATENT DOCUMENTS

| | | | | |
|---|---|---|---|---|
| 5,504,817 | * | 4/1996 | Shamir ..................................... | 380/30 |
| 5,796,830 | * | 8/1998 | Johnson et al. ......................... | 380/30 |
| 5,799,086 | * | 8/1998 | Sudia ....................................... | 380/30 |
| 5,838,792 | * | 11/1998 | Ganesan ................................. | 380/30 |
| 5,892,828 | * | 4/1999 | Perlman ................................. | 380/25 |
| 5,907,618 | * | 5/1999 | Gennaro et al. ....................... | 380/30 |
| 5,937,066 | * | 8/1999 | Gennaro et al. ....................... | 380/30 |

* cited by examiner

*Primary Examiner*—Salvatore Cangialosi
(74) *Attorney, Agent, or Firm*—Chapin & Huang, L.L.C.; Barry W. Chapin

(57) ABSTRACT

A communication system includes communication devices which communicate during a communication session. During communication session establishment, the devices exchange a session key in an encrypted manner for privacy. When one device has information to transfer to the other device, the one device will append the session key to the information and apply a hash function thereto to generate a hash value, and generate a message packet for transfer to the other device that includes an information portion containing the information and a hash value portion containing the hash value. When the other device receives the message packet, it will append the session key to the information from the information portion of the packet that it receives, and generate a hash value therefrom. If the receiving device determines that the generated hash value corresponds to the hash value received in the message packet, properties of the hash function that is used to generate the hash values enable it to conclude that the message packet was not tampered with during the transfer and that it originated from the one device. The system avoids the necessity of computation-intensive encryption and decryption for message packet transfer during a communication session.

75 Claims, 2 Drawing Sheets

SYSTEM AND METHOD FOR EFFICIENTLY IMPLEMENTING AN AUTHENTICATED COMMUNICATIONS CHANNEL THAT FACILITATES TAMPER DETECTION

FIELD OF THE INVENTION

The invention relates generally to the field of communications, and more particularly to a system and method for efficiently providing a, authenticated communications channel, that facilitates detection of tampering, for transferring information between a source device and a destination device over a network.

BACKGROUND OF THE INVENTION

Digital networks have been developed to facilitate the transfer of information, including data and programs, among digital computer systems and other digital devices. A variety of types of networks have been developed and implemented, including so-called "wide-area networks" (WANs), "local area networks" (LANs), which transfer information using diverse information transfer methodologies. Generally, LANs are implemented over relatively small geographical areas, such as within an individual office facility or the like, for transferring information within a particular office, company or similar type of organization. On the other hand, WANs are implemented over relatively large geographical areas, and may be used to transfer information between LANs, between devices that are not connected to LANs, and the like. WANs also include public networks, such as the Internet, which can carry information for a number of companies.

Several problems have arisen in connection with transfer of information over networks, particularly public networks. One problem is privacy, so that, if information to be transferred from a source device to a destination device over the network is intercepted by a third device, the intercepting device cannot determine what the actual information is. A second problem is tamper detection, so that, if information transferred from the source device to the destination device has been intercepted and tampered with by a third device, the tampering can be detected. A final problem is to ensure that information received by the destination device is "authentic," that is, that, if the information indicates that it has been transmitted by the source device, it (that is, the information) has actually be transmitted by the source device and not by a third device.

All of these problems are addressed by communication methodology as follows. When the source device has information ("INF") to be transferred, the source device first processes the information using a hash function to generate a hash value, that is, HASH(INF). Generally, a hash function takes an input value, in this case "INF," and generates therefrom an output value, in this case "HASH(INF)," that (1) is of fixed length, even though the length of the input value may vary;

(2) is such that the hash value generated using the hash function is highly likely to be unique; that is, that it is highly unlikely that different input values would "hash" to the same hash value; and (3) is such that, given the hash value "HASH(INF)," the input cannot be determined, with a high degree of probability, even if the hash function is known, that is, the hash function is not invertible.

With respect to condition (2) above, it is generally possible that different input values may hash to the same hash value, but if the number of possible hash values is made large enough, it would be extremely unlikely that two different input values would actually hash to the same hash value. If, for example, the length of the hash value is selected to be 128 digital data bits, then the number of possible different hash values would be $2^{128}$ (which corresponds to approximately $10^{38}$), which is an extremely large number. A number of hash functions are known, including, for example, those described in B. Schneier, "Applied Cryptography," 2d Edition (Wiley) (hereinafter "Schneier"), chapter 18, incorporated herein by reference. As will be described below, the destination device will be aware of the particular hash function used by the source device.

After generating the hash value HASH(INF), the source device will concatenate the hash value to the information to be transferred, thereby to generate an information packet "INF|HASH)(INF)"(where "|" represents the concatenation operation). The "HASH(INF)" portion of the information packet represents a signature value for the information portion "INF."

Finally, the source device will encrypt the entire information packet INF|HASH(INF), thereby to generate a message packet $E_{K\_KEY}$ (INF|HASH(INF)) to be transferred. The source device may use any encryption methodology, which will be known by the destination device. A number of encryption methodologies are known, including, for example, those as described in Parts II and III of Schneier, which is also incorporated herein by reference. Generally, encryption is performed in relation to one or more encryption key values (represented above by the subscript "E_KEY"). In one methodology, the source device can use a particular key value, which is also known by the destination device and which, as will be described below, will be used by the destination device in decrypting the message packet. In another methodology, which is known as the "public key/private key" encryption methodology, the source device will encrypt the information packet INF|HASH(INF) in relation to one value PRIV_S, termed the private key, to generate a message packet $E_{PRIV\_S}$ (INF|HASH(INF)) for transfer to the destination device.

When the destination device receives a message packet which is purportedly from the particular source device, it (that is, the destination device) will initially perform a decryption operation to generate a decrypted information packet $D_{D\_KEY}(E_{E\_KEY}$ (INF|HASH(INF))) using a decryption methodology and decryption key value "E_KEY" which will be related to the particular encryption methodology and encryption key value used by the source device. Decryption methodologies useful with the encryption techniques described in Parts II and III of Schneier are also described therein. If the source and destination devices are not using the public key/private key encryption methodology, the decryption key value "D_KEY" may be the same as the encryption key value "E_KEY" used by the source device in encrypting the operation. If the decryption key value "D_KEY" and the encryption key value "E_KEY" are the same, the encryption methodology is generally referred to as a symmetric cipher; an illustrative symmetric cipher is the Data Encryption Algorithm ("DEA") specified by the Data Encryption Standard ("DES") described in chapter 12 of Schneier. On the other hand, if the source and destination devices are using the public key/private key encryption methodology, then the key value used by the destination device would be the source device's public key value PUB_S, in which case the destination device would generate the decrypted information packet $D_{PUB\_S}$ (INF|HASH(INF))).

The encryption of the message packet that is transferred between the source and destination devices ensures that the information in the packet will be private, to a high probability, particularly if the encryption and decryption keys are maintained in secrecy and not known by potential interceptors. However, encryption does not verify that the information packet has not been tampered with by a third device, nor does encryption by itself necessarily verify that the information packet was, in fact, transmitted by the particular source device which the destination device believes transmitted it. To accomplish this, the destination device will initially assume that the decrypted information packet $D_{D\_KEY}(E_{E\_KEY}(\text{INF}|\text{HASH}(\text{INF})))$ has the structure $\text{INF}|\text{HASH}(\text{INF})'$, that is, that it has an information packet with a hash value appended thereto, with the hash value being of the same length as the hash value of the information packet that was encrypted by the source device. Using the same hash function as the source device would use in generating the information packet, the destination device generates a hash value from the information portion of the packet, that is, $\text{HASH}(\text{INF}')$, and compares it to the hash value portion $\text{HASH}(\text{INF})'$. If the two hash values are the same, then from property (2) of the hash function as described above, it would be extremely unlikely that the encrypted information packet transmitted by the source device would have been tampered with, since tampering would produce different information $\text{INF}'$, which would hash to a different hash value. In addition, except in the unlikely event that a third device knew the encryption key used by the source device, if the destination device determines that the two hash values are the same, then the destination device can determine that the information packet originated from the source device.

A problem arises in connection with the methodology described above, in that encryption and decryption is very computation intensive, particularly for truly secure encryption and decryption methodologies. Since encryption and decryption are computation intensive, they may result in an increase in the latency, or delay, which is required to accomplish an information transfer, the latency being due to the time required to encrypt and decrypt the information to be transferred. The latency may be reduced by using expensive and powerful computers or special-purpose encryption and decryption hardware, which can add to the cost of the devices engaging in the information transfer. In addition, the time required to generate the encrypted and decrypted information packets increases linearly with the size of the information to be encrypted and decrypted. Accordingly, where privacy of the information is not a requirement, but where tamper detection and authenticity is needed, a communication methodology has been developed whereby only the hash value is encrypted, using the same encryption and decryption methodologies as described above. In that case, even if a third device knows which hash function and encryption methodology the presumed source device is using, if it (that is, the third device) does not know the source device's encryption key, it cannot generate an encrypted hash value which, when decrypted by the destination device would correspond to the hash value generated by the destination device for the information portion of the packet. Thus, thus communication methodology ensures authenticity, that is, that a packet presumably from a particular source device is actually from that source device, and that it has not been tampered with. However, the encryption and decryption operations required in this communication methodology can still require a significant amount of computation, particularly during a communication session during which the source device may transfer several information packets to the destination device, or during which the respective devices may transfer a number of information packets bidirectionally therebetween.

SUMMARY OF THE INVENTION

The invention provides a new and improved communication system and method for providing a tamper-proof authenticated data communication channel.

In brief summary, a communication system in accordance with the invention includes a plurality of communication devices. The communication devices engage in communication sessions which are established between pairs of the communication devices. During a communication session, information may be transferred from one device, as a source device, to the other device, as a destination device. Alternatively, each device engaged in a communication session may operate as a source device as well as a destination device to facilitate transfer of information bidirectionally between the devices. To establish a communication session, the devices that are to be engaged in the session, before they transfer information, will engage in a session protocol negotiation during which they various session protocol information therebetween. During the session protocol negotiation, one of the devices will also generate a session key value SK, which it encrypts and transfers to the other device to engage in the session. Preferably the session key value SK will be a relatively large random number, which can be generated in a conventional manner. The other device, in turn, will decrypt the session key value SK. Accordingly, both devices will have the same session key value SK, but the session key value SK has been transferred therebetween encrypted to ensure privacy. Prior to encryption, a hash value can also be generated from the session key value SK and appended thereto prior to encryption, which can be used to also provide for tamper detection and authenticity.

Both devices will use the session key value as follows. When a device has information INF to transfer, it will generate a hash value from the information to be transferred, to which the session key has been appended, that is, $\text{HASH}(\text{INF}|\text{SK})$. Thereafter, the transferring device will transfer a message packet comprising the information INF to which the hash value has been appended, that is $\text{INF}|\text{HASH}(\text{INF}|\text{SK})$. When the other device engaging in the communication session receives the message packet, it will also generate a hash value from the information portion $\text{INF}'$ of the packet that it receives, to which the session key SK has been appended, that is, $\text{HASH}(\text{INF}'|\text{SK})$. If the receiving device determines that the hash value $\text{HASHINF}'|\text{SK})$ corresponds to the hash value $\text{HASH}(\text{INF}|\text{SK})$ which it receives in the message packet, since, from property (2) of the hash function as described above, that is, that it is highly unlikely that different input values would hash to the same hash value, it (that is, the receiving device) can determine that $\text{INF}'|\text{SK}$ corresponds to $\text{INF}|\text{SK}$, in which case the information $\text{INF}'$ that it receives corresponds to the INF transferred by the transferring device, thereby ensuring that the message packet has not been tampered with. In addition, since it is extremely unlikely that a third device would know the session key value SK, if the receiving device determines that the hash value $\text{HASH}(\text{INF}'|\text{SK})$ corresponds to the hash value $\text{HASH}(\text{INF}|\text{SK})$ which it receives in the message packet, the receiving device can determine that it is extremely unlikely that the message packet was transferred thereto by another device purporting to be the transferring device in the communication session, thereby ensuring authenticity of the message packet.

It will be appreciated that, given the non-invertability property of the hash function (property (3) described above), even if a third device intercepts a message packet containing an information portion INF and a hash value HASH (INF|SK), even though the third device knows the information portion, it would be extremely unlikely, it (that is, the third device) would be able to determine the input value INF|SK of the hash function, and thereby determine the session key SK. Accordingly, even though the hash value HASH(INF|SK) is transferred in plain text, that is, in unencrypted form, based on the hash function's non-invertability property, it is extremely unlikely that a third device would be able to determine the value of the session key from the message packet.

The invention reduces the computation load of engaging in a communication session by reducing the amount of encryption and decryption that is required. Since the invention requires encryption and decryption only of the session key, an encryption and decryption operation is required only once during the communication session to ensure privacy of the session key, not each time a message packet is transferred.

A session key value SK may be established once and used throughout the communication session, or a session key value may be used for a predetermined time interval and a new session key value may be generated for a subsequent time interval during the communication session. In addition, both devices engaging in the communication session may use the same session key value SK for information transferred thereby, or each device may generate an individual session key value for use in connection with information transferred thereby.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
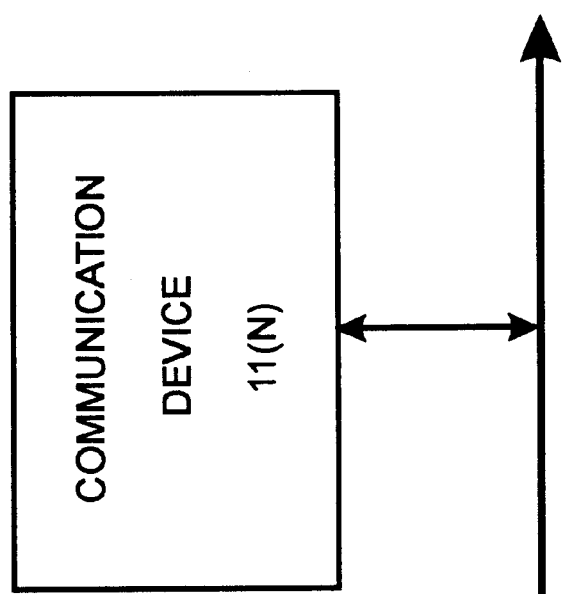
FIG. 1 is a functional block diagram of a communication system, including a plurality of communication devices, providing an authenticated communication channel in which tampering can be detected, in accordance with the invention.
Figure 1:
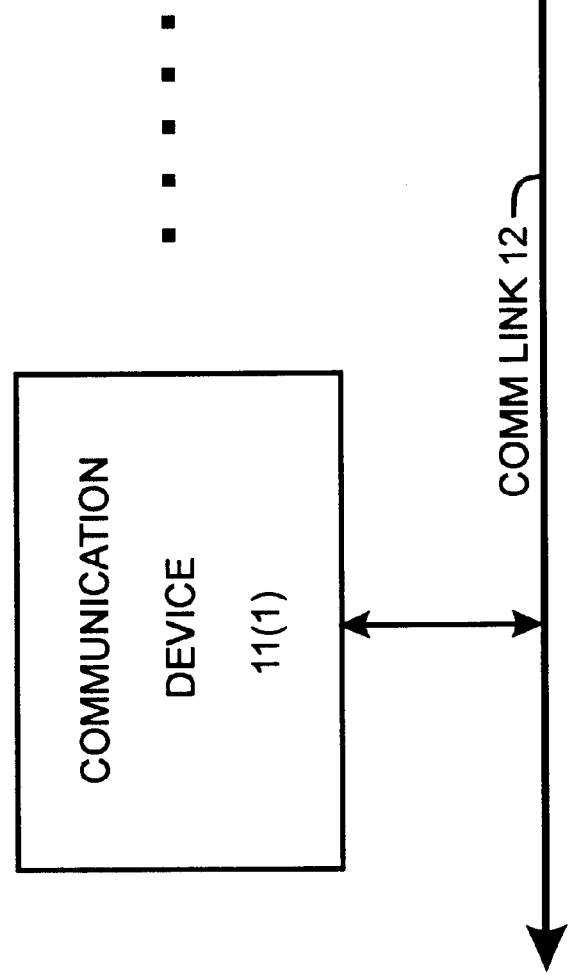

FIG. 1 is a functional block diagram of a communication system 10, including a plurality of communication devices 11(1) through 11(N) (generally identified by reference numeral 11(n)) which communicate over a network represented by communication link 12. The communication devices 11(n) may comprise any of a plurality of types of devices which may engage in communications over the network, including, for example, computers (including personal computers, workstations, and mini and mainframe computers), mass storage subsystems, and other elements for generating and using data, whether in digital form or otherwise.

The network may comprise a local area network (LAN), a public or private wide area network (WAN), a network such as the Internet or public telephony network, or any combination of such networks. As is conventional, the network includes a communications medium over which the communication devices 11(n) communicate, which can include, for example, wires, optical fibers or other media for carrying signals representing information among the communication devices. Each of the communication typically includes a network interface device (represented by respective arrows 14(n) and 15), which connects the respective computer to the communications link 13.

The communication devices engage in communication sessions which are established between pairs of the communication devices 11(n) and 11(n') (n'≠n). During a communication session, information may be transferred from one communication device 11(n), as a source device $11(n_S)$ (subscript "S" indicating the source device), to the other communication device 11(n'), as a destination device $11(n_D)$ (subscript "D" indicating the destination device). Alternatively, each communication device 11(n) and 11(n') engaged in a communication session may operate as a source device $11(n_S)$ as well as a destination device $11(n_D)$ to facilitate transfer of information bidirectionally between the respective devices. In accordance with the invention, to establish a communication session, the communication devices 11(n) and 11(n') to be engaged in the session perform a session establishment operation before they actually engage in the transfer of the information to be transferred during the session. During the session establishment operation, the communication devices 11(n) and 11(n'), engage in a session establishment and protocol negotiation during which they various session protocol information therebetween.

In performing the session establishment and protocol negotiation operation, the devices 11(n) and 11(n') will perform operations which are conventionally used in negotiating for establishment of a session and one or more communication protocols to be used in transferring information during the session. Generally, during such operations, the communication devices 11(n) and 11(n') will exchange one or more messages over the communication link 12 to establish the values of various communication parameters. In addition, to accommodate the invention, during the session establishment and protocol negotiation operation, one of the communication devices, illustratively communication device 11(n) will also generate a session key value SK, which it encrypts and transfers to the other communication device 11(n') that is to engage in the session. Preferably the session key value SK will be a relatively large random number, which can be generated in a conventional manner. The other communication device 11(n'), in turn, will decrypt the session key value SK. Accordingly, both devices will have the same session key value SK, but the session key value SK will have been transferred between the communication devices 11(n) and 11(n') in an encrypted manner to ensure privacy as against third party interception.

During the communication session, both communication devices 11(n) and 11(n') will use the session key value in connection with transfer of information therebetween, in the following manner. When a communication device, for example, communication device 11(n), as a source device $11(n_S)$, has an information packet INF to transfer to communication device 11(n'), it (that is, communication device 11(n)) will initially append the session key SK to the information INF to provide an augmented information packet INF|SK, where the vertical bar "|" represents the concatenation operation. The communication device 11(n) will generate a hash value from the augmented information packet, that is, HASH(INF|SK). Thereafter, the device will transfer a message packet comprising the information packet INF to which the hash value has been appended, that is INF|HASH(INF|SK). It will be appreciated that the portion of the message packet comprising the information packet to be transferred is in unencrypted form, that is, that it is in so-called "plain text," in which case any other device 11(n") (n"≠n, n') which receives the message packet can determine and use the information being transferred in the message packet.

When the other communication device 11(n') receives a message packet, purportedly from communication device 11(n), including the message packet comprising the information packet INF and the hash value HASH(INF|SK) as described above, it (that is, communication device 11(n')) will interpret the message packet as comprising two portions, namely, an information packet portion INF' and a hash value HASH(INF|SK)'. Since the hash value is of a fixed length and in a predetermined position in the message packet, which will be known to both communication devices 11(n) and 11(n'), the destination communication device 11(n') can readily determine which portion of the message packet contains the hash value, with the rest of the message packet comprising the information packet.

After the destination communication device 11(n') identifies the information packet INF' and the hash value HASH (INF|SK)" from the received message packet, it (that is, the communication device 11(n') will append thereto the session key SK, which established by the communication devices 11(n) and 11(n') during the session establishment and protocol negotiation operation, as described above, thereby to generate an augmented received information packet INF'|SK. Thereafter, the communication device 11(n') will generate a hash value from augmented information packet, that is, HASH(INF'|SK), using the same hash function as was used by the source communication device 11(n) in generating the hash value HASH(INF|SK) prior to transferring the message packet.

If the receiving device determines that the hash value HASH(INF'|SK) corresponds to the hash value HASH (INF|SK) which it receives in the message packet, since, from property (2) of the hash function as described above, that is, that it is highly unlikely that different input values would hash to the same hash value, it (that is, the destination communication device 11(n')) can determine with a high degree of probability that INF'|SK corresponds to INF|SK, in which case the information packet INF' that it receives corresponds to the information packet INF transferred by the source communication device 11(n). This will ensure to a high degree of probability that the message packet transmitted by the source communication device 11(n) has not been tampered with while it (that is, the message packet) is traversing the network.

In addition, since the session key SK is transferred between the communication devices 11(n) and 11(n') in an encrypted form during the session establishment and protocol negotiation operation as described above, it is extremely unlikely that a third communication device 11(n") (n"≠n, n') would have been able to intercept and determine the actual session key value SK used by the communication devices 11(n) and 11(n'). Thus, also from property (2) of the hash function as described above, if the if the destination communication device 11(n') determines that the hash value HASH(INF'|SK) that it generates from the received information packet INF' portion of the received message packet, corresponds to the hash value HASH(INF|SK) which it receives in the message packet, the destination communication device 11(n') can determine that it is extremely unlikely that the message packet was transferred thereto by another device purporting to be the source communication device 11(n) in the communication session, thereby ensuring authenticity of the message packet received by the destination communication device 11(n'). In addition, from the non-invertability property of the hash function (property (3) described above), even if a third communication device 11(n") (n"≠n, n') were to intercept a message packet containing an information packet INF and a hash value HASH (INF|SK), and though the third communication device 11(n") can readily determine the information in the information packet, it would be extremely unlikely that it (that is, the third communication device 11(n")) would be able to determine the input value INF|SK of the hash function, and thereby determine the session key SK. Accordingly, even though the hash value HASH(INF|SK) is transferred in plain text, that is, unencrypted, it is extremely unlikely that a third communication device 11(n') would be able to determine the value of the session key from the message packet.

Figure 2:
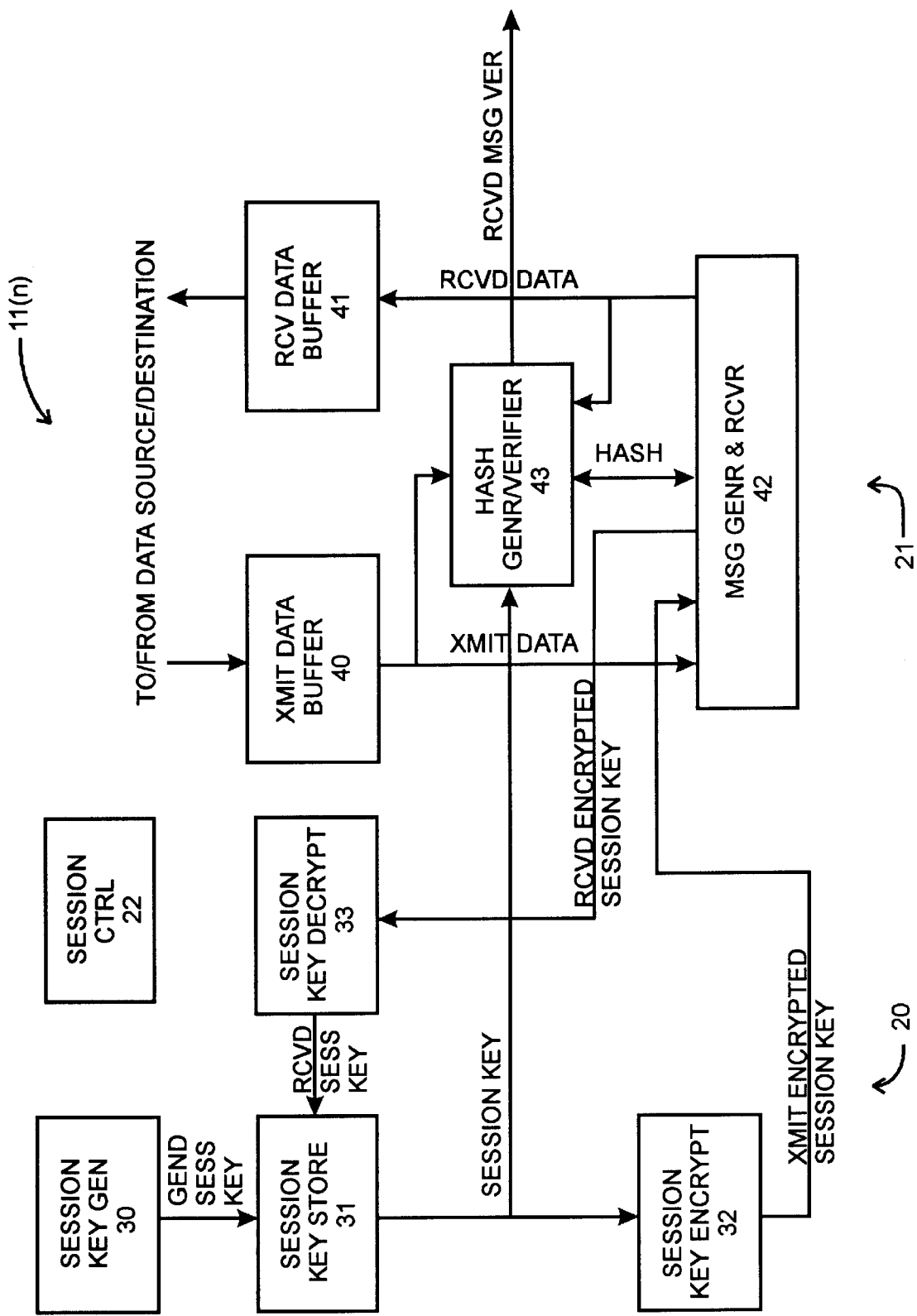
FIG. 2 is a functional block diagram of a communication device as depicted in FIG. 1.

FIG. 2 is a functional block diagram of a communication device, such as communication device 11(n). With reference to FIG. 2, the communication device 11(n) includes a session key control portion 20 and a message transfer portion 21, both of which are operate under control of a session control 22. If the communication device 11(n) is to generate the session key value SK for the communication session, the session key control portion 20 generates the session key value and stores it for subsequent use by the communication device 11(n) during the session. In addition, the session key control portion 20 encrypts the session key value SK for transmission to the other communication device 11(n') (n'≠n) during the session establishment and protocol negotiation operation. If the other communication device 11(n') is to generate the session key value, it will provide the session key value in encrypted form, and the session key control portion 20 will decrypt the encrypted session key value and store the session key value for subsequent use by the communication device 11(n) during the session.

The message transfer portion 21 handles communications with the other communication device 11(n') (n'≠n) during the communication session, in particular generating message packets for transfer to the other communication device 11(n') and receiving message packets from the other communication device 11(n') during the session. In generating a message packet, message transfer portion 21 will receive the stored session key value from the session key control portion 20 for use in generating the hash value for use in the message packet. In addition, for a received message packet, the message transfer portion 21 receives the stored session key value from the session key control portion 20 and generates a hash value for comparison with the hash value in the received message packet. The message transfer portion 21 is also used during the session establishment and protocol negotiation operation, in particular transferring the encrypted session key value provided by the session key control portion 20 to the other communication device 11(n') if the communication device 11(n) is to generate the session key value for the session. Alternatively, if the other communication device 11(n') is to generate the session key value for the session, the message transfer portion 21 will receive the encrypted session key value from the other communication device 11(n') and provide it to the session key control portion 20.

The session key control portion 20 includes a session key generator 30, a session key store 31, a session key encryptor 32 and a session key decryptor 33. If the communication device 11(n) is to generate the session key value for the communication session, the session key generator 30 generates a session key value, represented by the GEND_SESS_KEY signal, and provides it to the session key store 31 for storage. The session key generator 30 preferably comprises, for example, a conventional random or pseudo-random number generator. During the session establishment and protocol negotiation operation, the session key value stored in the session key store 31 is provided as a SESSION_KEY signal to the session key encryptor 32. The session key encryptor 32, in turn, generates from the session key value provided by the session key store an encrypted session key value, which it provides as an XMIT_ENCRYPTED_SESSION_KEY transmit encrypted session key signal to the message transfer portion 21 for transfer to the other communication device 11(n').

On the other hand, if the communication device 11(n) is to receive the session key value from the other communication device 11(n'), during the session establishment and protocol negotiation operation, the message transfer portion 21 will receive an encrypted session key value, represented by a RCVD_ENCRYPTED_SESSION_KEY received encrypted session key signal, from the other communication device 11(n') and provide it to the session key decryptor 33. The session key decryptor 33, in turn, decrypts the received encrypted session key value to generate the session key value, which it provides as a RCVD_SESS_KEY received session key signal to the session key store 31 for storage.

The message transfer portion 21 includes a transmit data buffer 40, a receive data buffer 41, a message generator and receiver 42 and a hash generator and verifier 43. The transmit data buffer 40 receives data to be transferred from a data source and buffers it (that is, the data) prior to transmission during a session. Data sources may comprise any of a number of types of sources of data, including, by way of example and not limitation, computer systems, mass storage subsystems, devices for generating data in digital or other forms, other networks and the like. Similarly, the receive data buffer 41 receives and buffers data transferred to the communication device 11(n) during a session prior to transferring it (that is, the buffered data) to a destination. As with data sources, data destinations may comprise any of a number of types of destinations for data, in digital or other forms.

The message generator and receiver 42 generates message packets for transmission over the communication link 12 (FIG. 1), and receives message packets from the communication link 12. In addition, the message generator and receiver 42 operates during the session establishment and protocol negotiation operation, receiving the encrypted session key value represented by the XMIT_ENCRYPTED_SESSION_KEY signal to the other communication device 11(n') (n'≠n) if the communication device 11(n) is to generate the session key value, or receiving the encrypted session key value from the other communication device 11(n') if the other communication device 11(n') is to generate the session key value for provision to the session key decryptor 33 as the RCVD_ENCRYPTED_SESSION_KEY signal.

During a communication session, when the communication device 11(n) is to transmit a message packet to the other communication device 11(n') (n'≠n), data from the transmit data buffer 40, represented by an XMIT_DATA signal, is provided to both the message generator and receiver 42 and the hash generator and verifier 43. The hash generator and verifier 43 also receives the session key from the session key store 31, represented by the SESSION_KEY signal, and generates a hash value, as described above, which it (that is, the hash generator and verifier 43) provides to the message generator and receiver 42, represented by a HASH signal. The message generator and receiver 42, in turn, receives the data from the transmit data buffer 40 and the hash value from the hash generator and verifier 43 and generates a message packet for transmission to the communication device 11(n'), the message packet including both the data and the hash value.

On the other hand, when the communication device 11(n) is to receive a message packet from the other communication device 11(n') (n'≠n), the message generator and receiver 42 provides the received data from the message packet, represented by the RCVD_DATA received data signal, to the receive data buffer 41 for storage. In addition, the message generator and receiver 42 provides both received data and the hash value from the message packet, the hash value being represented by the HASH signal, to the hash generator and verifier 43. The hash generator and verifier 43 generates a hash value from the received data and the session key provided by the session key store, represented by the SESSION_KEY signal, and compares the generated hash value to the hash value received in the message packet. If the hash generator and verifier 43 determines that the generated hash value corresponds to the hash value as received in the message packet, it (that is, the hash generator and verifier 43) asserts a RCVD_MSG_VER received message verified signal. On the other hand, if the hash generator and verifier 43 determines that the generated hash value does not correspond to the hash value as received in the message packet, it will negate the RCVD_MSG_VER received message verified signal. The session control 22 can use the RCVD_MSG_VER signal to verify that the received message packet was authentic and not tampered with during transfer from the other communication device 11(n').

The invention provides a number of advantages. In particular, the invention reduces the computation load of engaging in a communication session by reducing the amount of encryption and decryption that is required, allowing for minimal latency and the use of lower-cost communication devices in the system. Since the invention requires encryption and decryption only of the session key, an encryption and decryption operation is required only once or only a relatively small number of times during the communication session, to ensure privacy of the session key value, not each time a message packet is transferred.

It will be appreciated that numerous modifications may be made to the invention as described herein. For example, the communication devices 11(n) and 11(n') engaging in a communications session may establish a session key value SK once for use throughout the communication session. Alternatively the communication devices 11(n) and 11(n') may use a session key value SK for a predetermined time interval, and generate a new session key value SK' for use during a succeeding time interval, which may be repeated for each of a plurality of successive time intervals; preferably, each session key value SK, SK', . . . , generated for each time interval will be transferred by the communication device which generates the session key value to the other communication device in encrypted form, which will require multiple encryption and decryption operations during the communication session, but the number of such session key value transfers will normally expected to be far fewer than the be number of information packet transfers during the session.

In addition, both devices engaging in the communication session may use the same session key value SK for information transferred thereby, or each device may generate an individual session key value for use in connection with information transferred thereby.

In addition, it will be appreciated that the communication devices 11(n) can implement several methodologies during a communication session. That is, the communication devices can, for some of the message packets to be transferred, encrypt the entire message packet, or just the information packet portion or the hash value portion. In addition, for such message packets for which the hash value is encrypted, the hash value may be generated from just the information packet portion, or from the information packet concatenated with the session key value SK. The encryption of at least the information packet portion of a message packet may be particularly desirable if the information contained therein is to be maintained in private.

Furthermore, it will be appreciated that, if a communication device 11(n) will not be generating a session key value (which may occur if other communication devices 11(n') (n'≠n) will generate session key values for communication sessions including the communication device 11(n)), it need not include a session key generator 30 and session key encryptor 32. Contrariwise, if a communication device 11(n) will always be generating session keys for communication sessions, it need not include a session key decryptor 33. Similarly, if the communication device 11(n) will always be transmitting data to other communication devices 11(n'), it (that is, communication device 11(n)) need not include elements for receiving message packets and data, including the receive data buffer 41. Contrariwise, if the communication device 11(n) will always be receiving data from other communication devices 11(n'), it (that is, communication device 11(n) need not include elements for transmitting message packets and data, including the transmit data buffer 40.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A communications system comprising a plurality of communication devices interconnected by a network, two of said communication devices engaging in a communication session to transfer message packets therebetween,
    A. said two communication devices prior to said communication session initially engaging in a session establishment operation in which one of said two communication devices generates a session key and transfers the session key privately to the other of said two communication devices,
    B. the two communication devices, during the communication session, transferring data therebetween in at least one message packet,
        i. one of said two communication devices generating said at least one message packet to include said data and a hash value generated by applying a selected hash function to said data and said session key, and
        ii. the other of said two communication devices, upon receiving said at least one message packet, generating a hash value from the data in said message packet and said session key, and comparing the generated hash value to the hash value in the message packet.

2. A communication system as defined in claim 1 in which the other of said two communication devices determines whether the message packet originated from the one of said two communication devices based on the comparison between the generated hash value and the hash value in the message packet.

3. A communication system as defined in claim 1 in which the other of said two communication devices determines whether the message packet was tampered with during the transfer over the network based on the comparison between the generated hash value and the hash value in the message packet.

4. A communication system as defined in claim 1 in which, during the session establishment operation, the one of said communication devices encrypts the session key prior to the transfer to the other of said two communication devices.

5. A communication system as defined in claim 4 in which, during the session establishment operation, the other of said communication devices decrypts the encrypted session key after receiving the encrypted session key from the one of said two communication devices.

6. A communication system as defined in claim 1 in which said one of said two communication devices comprises:
    A. a session key control portion including:
        i. a session key generator for generating said session key; and
        ii. a session key encryptor for performing an encryption operation in connection with said session key generated by said session key generator, thereby to generate an encrypted session key; and
    B. a message transfer portion for transferring the encrypted session key to said other of said two communication devices.

7. A communication system as defined in claim 6 in which said one of said two communication devices further comprises a session key store for storing the session key generated by said session key generator.

8. A communication system as defined in claim 1 in which said other of said two communication devices comprises:
    A. a message transfer portion for receiving the encrypted session key from said other of said two communication devices; and
    B. a session key control portion including a session key decryptor for performing a decryption operation in connection with said session key received by said message transfer portion, thereby to provide a session key.

9. A communication system as defined in claim 8 in which said other of said two communication devices further comprises a session key store for storing the session key decrypted by said session key decryptor.

10. A communication system as defined in claim 1 in which said one of said two communication devices comprises a message transfer portion comprising:

A. a hash generator for generating a hash value by applying said selected hash function to said data and said session key; and B. a message generator for generating a message packet including said data and said hash value as generated by said hash generator, the message generator transferring the generated message packet to said other of two communication devices.

11. A communication system as defined in claim 1 in which said one of said two communication devices comprises a message transfer portion comprising:

A. a message receiver for receiving a message packet including said data and a hash value; and B. a hash verifier for generating a hash value by applying said selected hash function to said data and said session key, the hash verifier comparing the generated hash value to the hash value in the received message packet.

12. A communication system as defined in claim 11 in which the hash verifier determines whether the message packet originated from the other of said two communication devices based on the comparison between the generated hash value and the hash value in the message packet.

13. A communication system as defined in claim 11 in which the hash verifier determines whether the message packet was tampered with during the transfer over the network based on the comparison between the generated hash value and the hash value in the message packet.

14. A communication device for transferring data to another device over a network, the communication device comprising:

A. a hash generator for generating a hash value by applying said selected hash function to said data and a session key; and B. a message generator for generating a message packet for transfer over said network, the message packet including said data and said hash value as generated by said hash generator, the message generator transferring the generated message packet over said network.

15. A communication device as defined in claim 14 further comprising:

A. a session key control portion including:
  i. a session key generator for generating said session key; and
  ii. a session key encryptor for performing an encryption operation in connection with said session key generated by said session key generator, thereby to generate an encrypted session key; and B. the message generator transferring the encrypted session key to said other device.

16. A communication device as defined in claim 15 in which said session key control portion further comprises a session key store for storing the session key generated by said session key generator.

17. A communication device as defined in claim 14 further comprising:

A. a message receiver for receiving an encrypted session key from said other device; and B. a session key control portion including a session key decryptor for performing an decryption operation in connection with said session key received by said message transfer portion, thereby to provide a session key.

18. A communication device as defined in claim 17 further comprising a session key store for storing the session key decrypted by said session key decryptor.

19. A communication device for receiving data from another device over a network, the communication device comprising:

A. a message receiver for receiving a message packet over said network, the message packet including said data and a hash value; and B. a hash verifier for generating a hash value by applying said selected hash function to said data and said session key, the hash verifier comparing the generated hash value to the hash value in the received message packet.

20. A communication device as defined in claim 19, the communication device determining whether the message packet originated from the one of said two communication devices based on the comparison between the generated hash value and the hash value in the message packet.

21. A communication device as defined in claim 19, the communication device determining whether the message packet was tampered with during the transfer over the network based on the comparison between the generated hash value and the hash value in the message packet.

22. A communication device as defined in claim 19 further comprising:

A. a session key control portion including:
  i. a session key generator for generating said session key; and
  i. a session key encryptor for performing an encryption operation in connection with said session key generated by said session key generator, thereby to generate an encrypted session key; and B. the message generator transferring the encrypted session key to said other device.

23. A communication device as defined in claim 22 in which said session key control portion further comprises a session key store for storing the session key generated by said session key generator.

24. A communication device as defined in claim 19 further comprising:

A. a message receiver for receiving an encrypted session key from said other device; and B. a session key control portion including a session key decryptor for performing an decryption operation in connection with said session key received by said message transfer portion, thereby to provide a session key.

25. A communication device as defined in claim 24 further comprising a session key store for storing the session key decrypted by said session key decryptor.

26. A method of operating a communications system comprising a plurality of communication devices interconnected by a network, two of said communication devices engaging in a communication session to transfer message packets therebetween, comprising the steps of A. enabling the said two communication devices prior to said communication session to initially engage in a session establishment operation in which one of said two communication devices generates a session key and transfers the session key privately to the other of said two communication devices, B. enabling the two communication devices, during the communication sessions, to transfer data therebetween in at least one message packet, in the process
  i. enabling one of said two communication devices generating said at least one message packet to include said data and a hash value generated by applying a selected hash function to said data and said session key, and
  ii. enabling the other of said two communication devices, upon receiving said at least one message packet, generating a hash value from the data in said message packet and said session key, and comparing the generated hash value to the hash value in the message packet.

27. A method as defined in claim 26 further comprising the step of enabling the other of said two communication devices to determine whether the message packet originated from the one of said two communication devices based on the comparison between the generated hash value and the hash value in the message packet.

28. A method as defined in claim 26 further comprising the step of enabling the other of said two communication devices to determine whether the message packet was tampered with during the transfer over the network based on the comparison between the generated hash value and the hash value in the message packet.

29. A method as defined in claim 26 further comprising the step of, during the session establishment operation, enabling the one of said communication devices to encrypt the session key prior to the transfer to the other of said two communication devices.

30. A method as defined in claim 29 further comprising the step of, during the session establishment operation, enabling the other of said communication devices to decrypt the encrypted session key after receiving the encrypted session key from the one of said two communication devices.

31. A method as defined in claim 26 further comprising the step of enabling said one of said two communication devices to:
   A. generate said session key;
   B. perform an encryption operation in connection with said session key, thereby to generate an encrypted session key; and
   C. transfer the encrypted session key to said other of said two communication devices.

32. A method as defined in claim 31 further comprising the step of enabling said one of said two communication devices to store the session key.

33. A method as defined in claim 26 further comprising the step of enabling said other of said two communication devices to:
   A. receive the encrypted session key from said other of said two communication devices; and
   B. perform a decryption operation in connection with said received session key, thereby to provide a session key.

34. A method as defined in claim 33 further comprising the step of enabling said other of said two communication devices to store the session key.

35. A method as defined in claim 26 further comprising the step of enabling said one of said two communication devices to:
   A. generate a hash value by applying said selected hash function to said data and said session key;
   B. generate a message packet including said data and said generated hash value, and
   C. transfer the generated message packet over said network.

36. A method as defined in claim 26 further comprising the step of enabling said one of said two communication devices to:
   A. receive a message packet including said data and a hash value;
   B. generate a hash value by applying said selected hash function to said data and said session key; and
   C. comparing the generated hash value to the hash value in the received message packet.

37. A method as defined in claim 36 further comprising the step of enabling said one of said two communication devices to determine whether the message packet originated from the other of said two communication devices based on the comparison between the generated hash value and the hash value in the message packet.

38. A method as defined in claim 36 further comprising the step of enabling said one of said two communication devices to determine whether the message packet was tampered with during the transfer over the network based on the comparison between the generated hash value and the hash value in the message packet.

39. A method of transferring data to another device over a network comprising the steps of:
   A. generating a hash value by applying said selected hash function to said data and a session key; and
   B. generating a message packet for transfer over said network, the message packet including said data and said hash value.

40. A method as defined in claim 39 further comprising the steps of:
   A. generating said session key;
   B. performing an encryption operation in connection with said session key, thereby to generate an encrypted session key; and
   C. transferring the encrypted session key to said other device.

41. A method as defined in claim 40 further comprising the step of storing the session key generated during the session key generating step.

42. A method as defined in claim 39 further comprising the steps of:
   A. receiving an encrypted session key from said other device; and
   B. performing an decryption operation in connection with said encrypted session key, thereby to provide said session key.

43. A method as defined in claim 42 further comprising the step of storing the session key generated during the session key decryption step.

44. A method of receiving data from another device over a network, comprising the steps of:
   A. receiving a message packet over said network, the message packet including said data and a hash value;
   B. generating a hash value by applying said selected hash function to said data and a session key; and
   C. comparing the generated hash value to the hash value in the received message packet.

45. A method as defined in claim 44, further comprising the step of determining that the message packet originated from a particular other device based on the comparison between the generated hash value and the hash value in the message packet.

46. A method as defined in claim 44, further comprising the step of determining that the message packet was not tampered with during the transfer over the network based on the comparison between the generated hash value and the hash value in the message packet.

47. A method as defined in claim 44 further comprising the steps of:
   A. generating said session key;
   B. performing an encryption operation in connection with said session key, thereby to generate an encrypted session key; and
   C. transferring the encrypted session key to said other device.

48. A method as defined in claim 47 further comprising the step of storing the session key generated during the session key generating step.

49. A method as defined in claim 44 further comprising the steps of:
   A. receiving an encrypted session key from said other device; and
   B. performing an decryption operation in connection with said encrypted session key, thereby to provide said session key.

50. A method as defined in claim 49 further comprising the step of storing the session key generated during the session key decryption step.

51. A computer program product for use in connection with two communication devices interconnected by a network, to control the transfer of message packets therebetween, the computer program product comprising a communication device-readable medium having encoded thereon:
   A. a session establishment module for enabling said two communication devices prior to said communication session to initially engage in a session establishment operation in which one of said two communication devices generates a session key and transfers the session key privately to the other of said two communication devices,
   B. a session control module for enabling the two communication devices to transfer data therebetween in at least one message packet during the communication session; the session control module enabling
      i. one of said two communication devices to generate said at least one message packet to include said data and a hash value generated by applying a selected hash function to said data and said session key, and
      ii. the other of said two communication devices, upon receiving said at least one message packet, generating a hash value from the data in said message packet and said session key, and comparing the generated hash value to the hash value in the message packet.

52. A computer program product as defined in claim 51 in which the session control module enables the other of said two communication devices to determine whether the message packet originated from the one of said two communication devices based on the comparison between the generated hash value and the hash value in the message packet.

53. A computer program product as defined in claim 51 in which the session control module enables the other of said two communication devices to determine whether the message packet was tampered with during the transfer over the network based on the comparison between the generated hash value and the hash value in the message packet.

54. A computer program product as defined in claim 51 in which the session establishment module enables the one of said communication devices to encrypt the session key prior to the transfer to the other of said two communication devices.

55. A computer program product as defined in claim 54 in which the session establishment module enables the other of said communication devices to decrypt the encrypted session key after receiving the encrypted session key from the one of said two communication devices.

56. A computer program product as defined in claim 51 in which the session establishment module includes:
   A. a session key control portion including:
      i. a session key generator module for enabling the communication device to generate said session key; and
      ii. a session key encryptor module for enabling the communication device to perform an encryption operation in connection with said session key generated under control of said session key generator module, thereby to generate an encrypted session key; and
   B. a message transfer portion for enabling the one of said two communication devices to transfer the encrypted session key to said other of said two communication devices.

57. A computer program product as defined in claim 56 in which said session establishment module enables said one of said two communication devices to establish a session key store for storing the session key generated under control of said session key generator module.

58. A computer program product as defined in claim 51 in which said session establishment module includes:
   A. a message transfer portion for enabling said one of said two communication devices to receive the encrypted session key from said other of said two communication devices; and
   B. a session key control portion including a session key decryptor for enabling said communication device to perform a decryption operation in connection with said session key received by said message transfer portion, thereby to provide a session key.

59. A computer program product as defined in claim 58 in which said session establishment module enables said other of said two communication devices to establish a session key store for storing the session key generated under control of said session key decryptor module.

60. A computer program product as defined in claim 51 in which said session control module includes:
   A. a hash generator module for enabling the one of said communication devices to generate a hash value by applying said selected hash function to said data and said session key; and
   B. a message generator portion for enabling said one of said communication devices to generate a message packet including said data and said hash value as generated by said hash generator, and enable said one of said communication devices to transfer the generated message packet to said other of two communication devices.

61. A computer program product as defined in claim 51 in which said session control module includes:
   A. a message receiver module for enabling the other of said two communication devices to receive a message packet including said data and a hash value; and
   B. a hash verifier module for enabling the other of said two communication devices to generate a hash value by applying said selected hash function to said data and said session key, and compare the generated hash value to the hash value in the received message packet.

62. A computer program product as defined in claim 61 in which the hash verifier module enables the communication device to determine whether the message packet originated from the other of said two communication devices based on the comparison between the generated hash value and the hash value in the message packet.

63. A computer program product as defined in claim 61 in which the hash verifier module enables the communication device to determine whether the message packet was tampered with during the transfer over the network based on the comparison between the generated hash value and the hash value in the message packet.

64. A computer program product for enabling a communication device to generate a message packet to transfer data to another device over a network, the computer program product including a communication device readable medium having encoded thereon:

A. a hash generator module for enabling the communication device to generate a hash value by applying said selected hash function to said data and a session key;

B. a message generator module for enabling the communication device to generate a message packet for transfer over said network, the message packet including said data and said hash value as generated by said hash generator; and C. transfer the generated message packet over said network.

65. A computer program product as defined in claim 64 further comprising:

A. a session key control portion including:
  i. a session key generator module for enabling the communication device to generate said session key; and
  ii. a session key encryptor module for enabling the communication device to perform an encryption operation in connection with said session key generated under control of said session key generator module, thereby to generate an encrypted session key; and B. a message transfer portion for enabling the one of said two communication devices to transfer the encrypted session key to said other of said two communication devices.

66. A computer program product as defined in claim 65 in which said session establishment module enables said one of said two communication devices to establish a session key store for storing the session key generated under control of said session key generator module.

67. A computer program product as defined in claim 64 in which said session establishment module includes:

A. a message transfer portion for enabling said one of said two communication devices to receive the encrypted session key from said other of said two communication devices; and B. a session key control portion including a session key decryptor for enabling said communication device to perform a decryption operation in connection with said session key received by said message transfer portion, thereby to provide a session key.

68. A computer program product as defined in claim 67 in which said session establishment module enables said other of said two communication devices further comprises a session key store for storing the session key decrypted by said session key decryptor.

69. A computer program product for enabling a communication device to receive a message packet from another device over a network, the computer program product including a communication device readable medium having encoded thereon:

A. a message receiver for receiving a message packet over said network, the message packet including said data and a hash value; and B. a hash verifier for generating a hash value by applying said selected hash function to said data and said session key, the hash verifier comparing the generated hash value to the hash value in the received message packet.

70. A computer program product as defined in claim 69, in which the session control module enables the communication device to determine whether the message packet originated from another communication device based on the comparison between the generated hash value and the hash value in the message packet.

71. A computer program product as defined in claim 69 in which the session control module enables the communication device to determine whether the message packet was tampered with during the transfer over the network based on the comparison between the generated hash value and the hash value in the message packet.

72. A computer program product as defined in claim 69 further comprising:

A. a session key control portion including:
  i. a session key generator module for enabling the communication device to generate said session key; and
  ii. a session key encryptor module for enabling the communication device to perform an encryption operation in connection with said session key generated under control of said session key generator module, thereby to generate an encrypted session key; and B. a message transfer portion for enabling the one of said two communication devices to transfer the encrypted session key to said other of said two communication devices.

73. A computer program product as defined in claim 72 in which said session establishment module enables said one of said two communication devices to establish a session key store for storing the session key generated under control of said session key generator module.

74. A computer program product as defined in claim 69 in which said session establishment module includes:

A. a message transfer portion for enabling said one of said two communication devices to receive the encrypted session key from said other of said two communication devices; and B. a session key control portion including a session key decryptor for enabling said communication device to perform a decryption operation in connection with said session key received by said message transfer portion, thereby to provide a session key.

75. A computer program product as defined in claim 74 in which said session establishment module enables said other of said two communication devices further comprises a session key store for storing the session key decrypted by said session key decryptor.

* * * * *